//

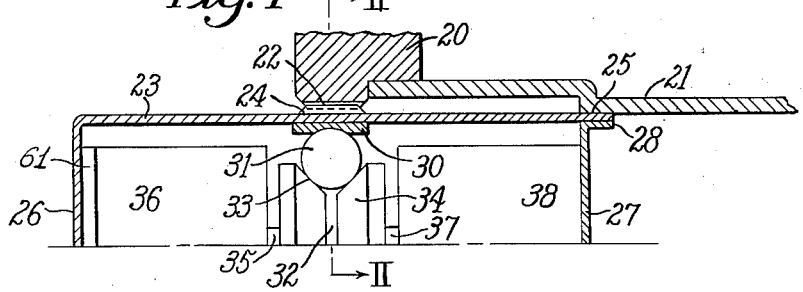
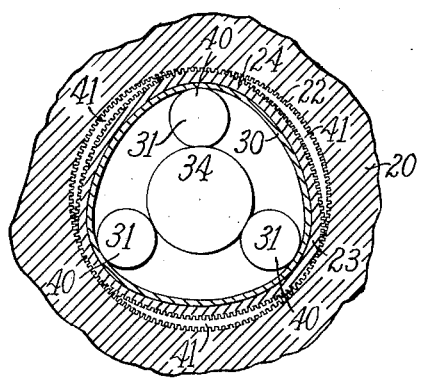
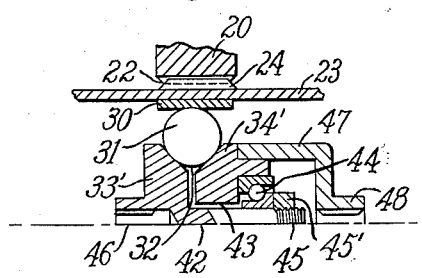
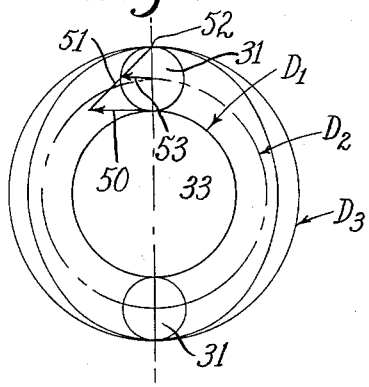

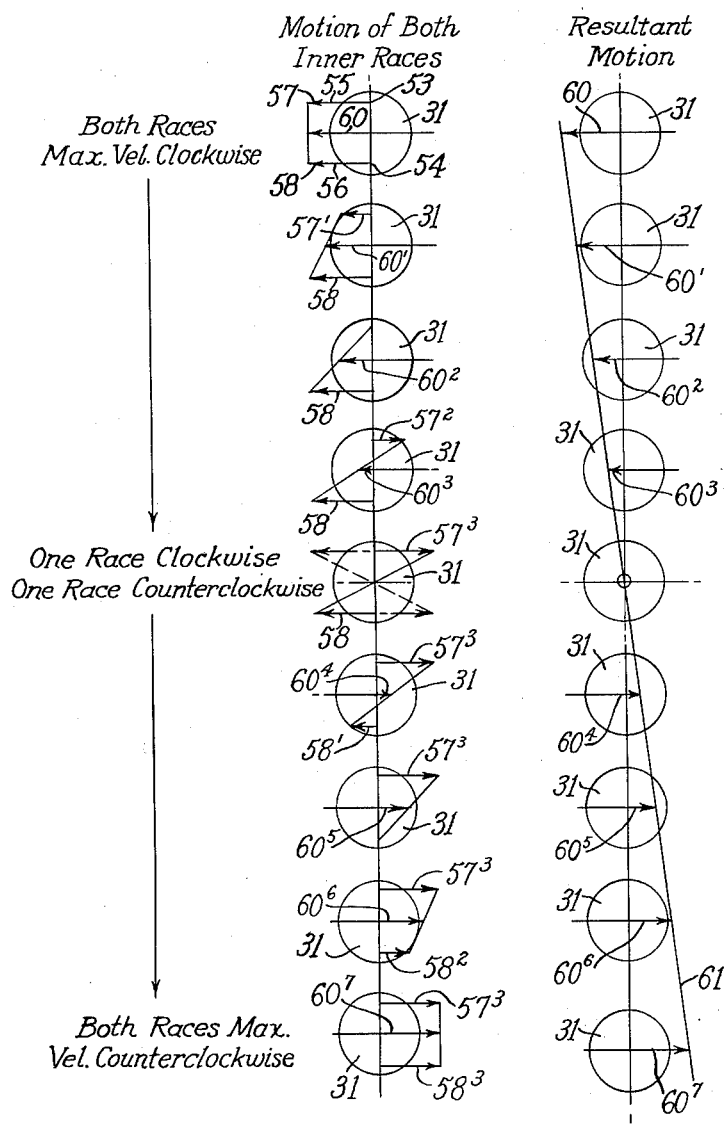

United States Patent Office 3,101,009
Patented Aug. 20, 1963

3,101,009
DIFFERENTIAL CONTROL
C. Walton Musser, Palos Verdes Estates, Calif., assignor to United Shoe Machinery Corporation, Boston, Mass., a corporation of New Jersey
Filed Nov. 1, 1961, Ser. No. 149,455
14 Claims. (Cl. 74—640)

The present invention relates to differential controls of the character which can give a variable ratio in a drive or the like.

A purpose of the invention is to provide a wave generator for a harmonic drive which has inner and outer races, with planetary ball elements interposed between and producing lobes on the deflectable gear element of the harmonic drive, and to separate one of the races into parts and separately operate those parts, so that one part of the separated race can be driven oppositely from the other part, or one part can be driven when the other is stationary, or the two parts of the separated race can be separately driven at different speeds in the same direction, both of which speeds can be variable, or both of which can be constant, or one of which can be variable and the other constant, or one part of the separated race can be stationary while the other is driven in any desired direction and at any desired speed.

A further purpose is to permit an input to run constantly on a harmonic drive and to vary the ratio so as to obtain the desired output speed.

A further purpose is to permit two inputs to run constantly on a harmonic drive without producing any output motion.

A further purpose is to provide redundant inputs, either of which can be used without using the other.

A further purpose is to interconnect the portions of the wave generator race by means of a thrust-bearing and preferably also to make the portions axially adjustable.

A further purpose is to drive planetary balls at selectively different speeds on opposite sides of a ball race and to take off from another ball race the resultant velocity thus produced.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is an axial half section of one embodiment of the device of the invention.

FIGURE 2 is a transverse section taken in a plane coinciding with the line 2—2 of FIGURE 1.

FIGURE 3 is a fragmentary diagrammatic view similar to FIGURE 1 showing a variation.

FIGURE 4 is a view similar to FIGURE 2 showing an elliptoidal wave generator instead of a 3-lobe wave generator.

FIGURE 5 is a series of vector diagrams showing the relative velocities of the device of the invention.

Describing in illustration but not in limitation and referring to the drawings:

Harmonic drives of the character shown in my U.S. Patents Nos. 2,906,143; 2,929,265; 2,929,266; 2,930,254; 2,931,248; 2,931,249; 2,932,986; 2,943,513 and 2,959,065, have been used with a single wave generator and a single cooperating gear reduction unit. The essential parts have usually ben a wave generator, a strain gear or flexspline, and a circular spline. A single speed or a single ratio is usually produced.

There are many drive applications where it would be desirable to produce a highly variable ratio. In mechanism of this character, obtaining an infinite ratio, that is, a point at which the output will not rotate when the input is rotating, is very difficult. In order to give the maximum control to the system, it would also be desirable to have the input constantly running and be able to vary the ratio so as to obtain the desired output velocity. This has been done in the past by various types of differentials.

The present invention is concerned with a novel type of differential—one which may be applied by means of a harmonic drive but is not necessarily thus limited.

There are a number of different advantages which can be gained by a device of this kind, its control versatility being indicated in that:

(1) The output velocity can vary from the maximum in one direction to the maximum in the other direction without the necessity of operating an input through the same velocity range. Thus two inputs can be provided which can run at full speed while the output is producing no motion. At this point, of course, there is a maximum ratio.

(2) The device can be used for control by having one input operate at a constant velocity and the other input matched against it, with the output used for control purposes. For example, if one input motor is operated at 100 r.p.m. in one direction from a constant source and the other input motor were to be operated at 100 r.p.m. in the opposite direction from a variable source, the output through the circular spline could be used for purposes of regulating the variable input.

(3) In many instances, particularly in guided missiles, redundancy is desired. This means that there is an alternate method of producing the end result which is not influenced by failure of the first method. This means, in the case of a drive, that there must not only be two sources of operation, but one source of operation must be completely independent of the other source of operation. In many applications this is very difficult to obtain. With the device of the invention, however, one input motor can be producing the total operation while the other input motor is essentially locked or standing still. In the event of failure of the input motor which is operating, the other input motor could be put into action and the device would then operate from the other input motor. Thus there are two separate input motors either of which can operate the output.

(4) The device can be used with one motor doing the control while the other motor is standing by to give a modifying effect to the output of the first motor. Thus, one input motor can run at more or less a constant velocity and the other input motor can add or subtract from the output velocity as desired, for example to operate some process equipment.

(5) The entire device can very satisfactorily be hermetically selaed in a container.

FIGURE 1 illustrates a circular spline 20 journalled on a housing extension 21 and having at its interior a set of circular spline teeth 22.

Telescoping within the housing is a flexible tube 23 which has around the outside a set of external flexspline teeth 24 which are deflected at a plurality of circumferentially spaced lobes to engage and mesh with the interior circular spline teeth 22, the flexspline teeth 24 intermediately being out of contact and out of mesh with the circular spline teeth 22 as well known in harmonic drives. The tube 23 is fastened at 25 to the housing extension 21 and the tube has hermetic end closures 26 and 27 producing a hermetically sealed container suitably by welding at 28.

Immediately within the tube 23, opposite the locality where the flexspline teeth 24 are located, there is a bearing race 30 which is part of the wave generator and is deflected by the wave generator to produce the lobes located at the points where the flexspline teeth 24 are in contact with the circular spline teeth 22. While the race 30 is shown as a separate element, it will of course be understood that it can be formed on the inside of the flexible tube 23 if desired.

At the lobes of the wave generator, the outer race 30 receives and guides planetary balls 31. The planetary balls are retained at the inside by an inner circular race 32 which is divided into two parts or halves 33 and 34 each of which is suitably conical as shown so that its conical surface can bear against the balls. The circular race half 33 is concentrically mounted on shaft 35 of reversible electric motor 36 and the circular race half 34 is concentrically mounted on shaft 37 of reversible electric motor 38 (both shafts are on the same axis), the motor housings being respectively mounted on the end closures 26 and 27 which cooperate with tube 23 to make the hermetic container. The source of power for the electric motors can be within the container in the case of batteries or can pass through hermetic electrical conducting bushings (not shown) as desired. Where it is desired to prevent rotation of one of the motors, this can be done by electrical energization of a brake 61 contained within the motor 36 as well known.

Thus in effect in FIGURE 1 there are two electric motors 36 and 38 each driving one half of the inner race 32 with the balls 31 contacting both inner race halves. The balls then function essentially as planets since they are held in their planetary spaced relationship by the fact that the outer race 30 is closer to the inner race at points between the balls. When the net effect of the inner race is to turn the balls in one direction, the balls 31 are carried around the inner circumference of the outer race and generate an elliptoid or a three-lobe figure as desired. As these planets move around in their orbit, they cause the shape of the outer race to rotate and since this shape is in intimate contact with the hermetically sealed tube 23 having the flexspline teeth 24 on it, this causes the shape to rotate around the wall of the tube 23 as well. The flexspline teeth 24 on the outside are free to carry the wave shape and their points of contact with the interior of the circular spline teeth 22 travel around the circular spline.

If we assume that the circular spline 20 is stationary and that the motors 36 and 38 in the hermetically sealed container, the tube 23 which is attached to them, and the housing extension 21 are the rotating member, it will be evident that the drive of the motors can control the relative motion. A construction somewhat similar to this has been proposed for a space vehicle in which he motion of the tube 23 orients the solar cells. In this particular instance circular spline 20 is made of polytetrafluoroethylene (Teflon) which has relatively good bearing properties in space, and the outside of the Teflon was encased in aluminum to prevent deterioration from radiation. The outer shell of the hermetically sealed container including the tube 23 was made from thin aluminum and the tube 23 and the housing extension 21 were rotated through about 180 degrees and then back again. It was necessary to have redundancy and also to have extremely precise control. It was also desirable to have a fast slewing or seeking ability to initially seek out the sun.

The very fine control was accomplished by the running of both motors 36 and 38, so as to turn the race halves one in one direction and the other in the other direction with relative speed variation of one motor.

The fast slewing action was obtained by running the motors 36 and 38 so as to turn the race halves in the same direction. The redundancy was obtained in the case of the failure of one motor by the capability of operating the drive from the other motor alone even though the degree of control was reduced.

FIGURE 2 shows a transverse section on the line 2—2 through the wave generator of FIGURE 1, which, in this case, is a 3-ball planetary wave generator. FIGURE 2 shows the harmonic drive. As will be seen, the inner race half 34 constitutes the sun, the balls 31 constitute the planets, the outer race 30 surrounds the balls and the tube 23 carries the flexspline 24 with teeth on the outside which fit within the circular spline teeth 22. As is well known in the harmonic drive field, the respective sets of teeth are in full engagement at the three lobes 40 of the wave generator and the teeth are out of mesh and out of phase at the intervening circumferential positions 41 between the lobes. It is important for the purposes of the present invention that the balls 40 be capable of acting as planetary elements. It is not, however, necessary that there be a particular number of lobes and at a later point in the discussion two lobes are shown. The difference in the number of teeth however should be equal to or a multiple of the number of lobes, the greater number of teeth of course being on the outer side. (In this case the circular spline.)

The importance of the planetary action is due to the fact that the balls must change their resultant velocity due to the varied action of the two input inner races.

It will be evident that there is a distinctly different character of transfer of power in a harmonic planetary from that of other planetaries. Planetary drives generally have a sun gear, planet gears mounted on a planet carrier and an outside circular gear into which the teeth on the planets mate. This general setup appears in many versions. The power flow usually goes from the sun to the planet carrier with the circular gear grounded or stationary. In such a standard planetary system whether it employs gears or rollers, the three elements of the common gear system are the sun, the planet carrier and the outer gear. These correspond to the usual elements in any gear system, the driver, the driven and the fixed member. In the usual planetary system, one of the elements becomes the driver, another becomes the driven and the third becomes the fixed member. The word "fixed" is used in a general sense, since this member could also be moving but it provides the leverage that is required in any gearing system, since there is in essence a lever arm having two ends and a fulcrum about which it pivots.

In a harmonic drive planetary, the planet carrier does not need to exist. As a result the tangential load on the balls is considerably lessened from that which it would be in any standard planetary system.

Referring to FIGURE 2, the sun, when it rotates, causes the planet to orbit around the sun and within the outer race of the bearing. In orbiting, however, it is not necessary for the parts to "drag along" any planet carrier or any output element which is normally connected to the output of the planet carrier.

Instead of the planets being attached to a carrier from which the output is taken, they merely ride in the crest of a wave and, as they rotate in their orbit, they cause the wave to circumferentially progress. The output load on a standard planet is tangential to its orbit and through the center of the planet. The loading on a harmonic drive planet is largely radial with a small angular component due to wave progression.

As a consequence, it is possible to use the planet elements in a different manner from that of usual planetary gearing. In the device of the present invention the balls are made to roll along different axes dependent upon the relative rotational velocity or direction of the inner races. If the two inner race halves are going in the same direction and at the same velocity and they are of the same diameter, then the planets will be rolling so that their axes are parallel to the axes of the inner bearing race. However, if one half, or one side, of the inner bearing race is not rotating, then the axes of the planet balls are located differently than they were before and as a consequence their planetary action will be changed.

It is possible, therefore, according to the present invention to manipulate the planets so as to obtain different ratios when the inner race is split and the parts are separately operated.

In FIGURE 3 I show a variation of the device of the invention which has an axial extension 42 from the inner race half 33', which extends within an axial opening 43 in the inner race half 34'. The extension 42 is connected with the inner race of an anti-friction journal and thrust bearing 44 whose outer race is mounted on the inner race half 34'. The axial spacing between the inner race halves 33' and 34' is adjustable by thread 45 engaged by nut 45' acting against the inner race of bearing 44.

The arrangement disclosed in FIGURE 3 solves the problem of loading the inner races 33' and 34' by the axial thrust from the radial load of the planets. The half 33' of the inner race has a spline opening 46 for connection to the motor shaft 35 and the inner race half 34' has a cup portion 47 which has a spline opening 48 to connect to the shaft 37.

FIGURE 4 is an elliptoid section similar to FIGURE 2 which illustrates the instantaneous velocity vector for a ball planetary device. The inner race has a diameter $D_1$, and the outer race has an effective diameter $D_3$. The planets are actually rolling around on the inside of the outer race 30 and $D_3$ is the diameter inside the outer race 30 at the major axis. $D_2$ is the diameter of the center of the planet or the orbit diameter around the sun.

If the sun has an angular velocity as indicated by the vector 50 extending tangentially from the point on the sun's circumference where it touches the planet 31, a vector line 51 can be drawn from the end of the vector 50 to the stationary point 52 where the planet 31 contacts the inside of the outer bearing race 30 at the major axis. The resulting velocity of the planet in its orbit is represented by the vector 53 which is drawn tangential to the orbit $D_2$ from the center of the planet to the intersection of the line 51.

One simple way to calculate planetary ratios is to take the diameter of the fixed point contacted by the planet and divide by the sun diameter and add one. This gives the ratio of the sun rotation to the planet carrier rotation in a standard planetary gear. However, since the effective planet diameter in the present invention is altered due to the conic angle with which the inner race contacts the planet, the planetary ratio for this differential control will be as follows:

$$\frac{D_2}{D_1} \times \frac{D_3 - D_1}{D_3 - D_2}$$

This equation applies for a simple presentation where a single sun is used. The length of the vector for $D_1$, when a multiple sun is used, is the resultant of the vectors for the individual suns.

The planetary ratio should be considered as the relationship of the number of revolutions of the sun to the number of planetary rotations of the planets about the sun. Altering the radial positions of the planets, which effectively changes the length of the tangential sun vector for $D_1$, will change this planetary ratio. Of course, when incorporated with harmonic drive the ratio for the overall system will be the harmonic drive ratio multiplied by the planetary ratio. Thus, if the harmonic drive ratio were 100 to 1, when used with a 5 to 1 planetary ratio the overall ratio would be 500 to 1. Hence, any change in the planetary ratio will cause a corresponding change in the overall ratio.

Reference is made to FIGURE 5 where the effect of a series of different inner race velocities is illustrated. The lefthand column of circles illustrates by vector lines the motion of both of the inner race halves, and the righthand column indicates the resultant motion derived therefrom.

Each of the circles represents a planetary ball as seen looking out radially from the center of the inner race. Accordingly, there are two contact points 53 and 54 for each planetary ball, one being the point where the righthand race half contacts it and the other being the point where the lefthand race half contacts it. If both of these inner race halves have an angular velocity 55, 56, at the point of contact of the inner race with the planet ball, which is the same direction and of the same magnitude, vector lines 57 and 58 could be used to depict these velocities as shown in the upper left of FIGURE 5. The resultant of these two velocities would be vector 60 shown in the upper righthand corner of the diagram as well as in the upper left. Vector 60 would be the effective velocity from which the planetary ratio could be calculated. For example, it could be substituted for vector 50 in FIGURE 4.

If now the velocity of one of the race halves is diminished, the vector 57 becomes 57' but vector 58 remains the same and the resultant 60 is diminished to 60' as shown in the second row from the top of FIGURE 5. If now the velocity indicated by vector 57' is diminished to zero as shown in the third row from the top of the diagram of FIGURE 5, the resultant is diminished to $60^2$.

If now the velocity indicated by the vector 57 reverses to vector $57^2$ as shown in the 4th row from the top, the resultant diminishes to $60^3$.

Now if the velocity indicated by vector 57 is not only reversed but increased to $57^3$ to equal the magnitude of vector 58 the resultant is zero as shown in the middle row from the top of FIGURE 5. The dotted lines show that this also can happen with the direction of both race halves reversed.

If the vector indicated by $57^3$ is retained and the velocity indicated by 58 diminishes to 58' as shown in the 6th row from the top, the resultant $60^4$ is reversed. With reduction of the velocity indicated by the vector 58 to zero as indicated in the 7th row from the top, the resultant vector $60^5$ is increased in the reverse direction as shown in the 7th row from the top of FIGURE 5.

Now if the velocity indicated by vector 58 is reversed to a value of $58^2$ as shown in the 8th row from the top of FIGURE 5, the resultant $60^6$ is increasing in the reverse direction and if the reversed velocity indicated by vector 58 is still further increased to the vector $58^3$ the resultant $60^7$ is a maximum in the reverse direction as shown by the bottom row in FIGURE 5. All of the resultants can be connected by a line 61 which shows the velocity range in the righthand diagrams in FIGURE 5.

It will of course be evident that the choice of which input is clockwise and which input is counterclockwise in these diagrams is purely arbitrary and for the purposes of illustration.

These diagrams serve to illustrate a wide variation of different conditions which may be used in the device of the invention to obtain different ratios and therefore different outputs from particular inputs.

For each of the conditions represented there is a mirror-image which can be produced by applying the particular velocities on opposite motors.

It should be evident from the above that the vector 50 for the sun in the above discussion of FIGURE 4 is the effective vector obtained as the resultant from the two inner races under particular operating conditions in FIGURE 5.

It will be evident, of course, that the relative inside and outside relation of the wave generator, the flexspline and the circular spline could be reversed if desired.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a differential control, a first member having a set of circular teeth, a second member telescoping with the first member and having a set of teeth, said second member being deflectable and having its teeth in contact with the teeth on the first member at a plurality of circumferentially spaced points with intermediate points at which the teeth are out of contact and out of mesh, a first race on the surface of the second member remote from the first member and deflectable to conform to the second member, planetary balls engaging in the first race on the side remote from the second member at spaced points corresponding to the points at which the teeth are in contact, a second race of circular form engaging the balls on the side remote from the first race, said second race having a plurality of separate race portions which engage different portions of said balls, respectively, and means for independently driving one of said second race portions with respect to another second race portion.

2. A control of claim 1, in combination with means for variably driving the other second race portion.

3. A control of claim 1, in combination with means for independently driving the other second race portion.

4. A control of claim 1, in combination with means for driving the other second race portion in the opposite direction from the drive of the one second race portion.

5. A control of claim 4, in which both races are driven at the same speed.

6. A control of claim 1, in combination with means for driving the other second race portion in the same direction but at a different speed from the drive of the one second race portion.

7. A control of claim 1, in combination with means for driving the other portion of the second race in the same direction and at the same speed as the one portion of the second race.

8. A control of claim 1, in which the one second race portion is driven at constant speed, in combination with means for driving the other second race portion at a variable speed.

9. A control of claim 1, in combination with means for holding the other second race portion rotationally stationary.

10. A control of claim 1, having three planetary balls distributed around the circumference.

11. A control of claim 1, having two planetary balls distributed around the circumference.

12. A control of claim 1, in combination with thrust bearing means interposed between the portions of the second race.

13. A control of claim 1, in combination with means for adjusting the axial positions of the second race portions with respect to one another.

14. In a drive mechanism, an outer race, an inner race, planetary balls at circumferentially spaced positions engaged between the inner and the outer race, one of the inner and outer races being separated into two separate race portions each of which engages the planetary balls, means for separately driving the separate race portions in opposite directions and thereby producing a resultant velocity to drive the other race, and means for taking off an output from the race which is not separated.

References Cited in the file of this patent
UNITED STATES PATENTS

| | | |
|---|---|---|
| 1,686,446 | Gilman | Oct. 2, 1928 |
| 2,398,346 | Anderson | Apr. 16, 1946 |
| 2,862,407 | Lutz | Dec. 2, 1958 |
| 2,931,248 | Musser | Apr. 5, 1960 |